United States Patent
Sprachmann et al.

(10) Patent No.: US 10,669,486 B2
(45) Date of Patent: Jun. 2, 2020

(54) PROCESS FOR PREPARING A PARAFFIN PRODUCT

(71) Applicant: SHELL OIL COMPANY, Houston, TX (US)

(72) Inventors: Gerald Sprachmann, Amsterdam (NL); Paul Jason Williams, Richmond, TX (US); Mahesh Venkataraman Iyer, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/430,921

(22) Filed: Jun. 4, 2019

(65) Prior Publication Data

US 2019/0284480 A1   Sep. 19, 2019

Related U.S. Application Data

(62) Division of application No. 15/747,485, filed as application No. PCT/EP2016/067744 on Jul. 26, 2016, now Pat. No. 10,351,780.

(30) Foreign Application Priority Data

Jul. 28, 2015   (EP) .................................... 15178563

(51) Int. Cl.
| | | |
|---|---|---|
| C01B 3/34 | (2006.01) | |
| C10G 2/00 | (2006.01) | |
| B01D 53/22 | (2006.01) | |
| C10K 3/04 | (2006.01) | |

(52) U.S. Cl.
CPC ............ *C10G 2/341* (2013.01); *B01D 53/228* (2013.01); *C01B 3/34* (2013.01); *C10G 2/30* (2013.01); *C10K 3/04* (2013.01); *B01D 2053/224* (2013.01); *C01B 2203/0283* (2013.01); *C01B 2203/043* (2013.01); *C01B 2203/0405* (2013.01); *C01B 2203/062* (2013.01); *C01B 2203/148* (2013.01); *C10G 2300/1025* (2013.01)

(58) Field of Classification Search
CPC .. C10G 2/341; C10G 2/30; C10G 2300/1025; B01D 53/228; B01D 2053/224; C10K 3/04; C01B 3/34; C01B 2203/062; C01B 2203/0283; C01B 2203/0405; C01B 2203/043; C01B 2203/148
USPC ......................................................... 422/608
See application file for complete search history.

(56) References Cited

U.S. PATENT DOCUMENTS

| | | | |
|---|---|---|---|
| 6,562,110 B2 | 5/2003 | Koros et al. | |
| 8,486,179 B2 * | 7/2013 | Kiyono | ............... B01D 53/228 95/51 |
| 2004/0077736 A1 | 4/2004 | Steynberg et al. | |
| 2005/0139072 A1 | 6/2005 | Landrum et al. | |
| 2008/0300326 A1 | 12/2008 | Schneider et al. | |
| 2012/0056132 A1 | 3/2012 | Allam | |
| 2013/0000484 A1 | 1/2013 | Williams | |
| 2014/0357737 A1 * | 12/2014 | Abbott | ................... C10K 1/005 518/704 |
| 2015/0094445 A1 | 4/2015 | Bhuwania et al. | |
| 2015/0290596 A1 * | 10/2015 | Koros | .................. B01D 53/228 95/45 |

FOREIGN PATENT DOCUMENTS

| | | | | |
|---|---|---|---|---|
| WO | 2004078642 A1 | 9/2004 | | |
| WO | 2007045966 A2 | 4/2007 | | |
| WO | 2011053403 A1 | 5/2011 | | |
| WO | WO-2013038140 A1 * | 3/2013 | ............. | C10K 1/005 |
| WO | 2013095775 A1 | 6/2013 | | |
| WO | WO-2014070789 A1 * | 5/2014 | .......... | B01D 53/228 |
| WO | 2014102393 A1 | 7/2014 | | |

OTHER PUBLICATIONS

International Search Report and Written Opinion received for PCT Patent Application No. PCT/EP2016/067744 dated Sep. 23, 2016, 10 pages.

* cited by examiner

*Primary Examiner* — Huy Tram Nguyen

(57) ABSTRACT

The Fischer-Tropsch process can be used for the conversion of hydrocarbonaceous feed stocks into normally liquid and/or solid hydrocarbons (i.e. measured at 0° C., 1 bar). The feed stock (e.g. natural gas, associated gas, coal-bed methane, residual oil fractions, biomass and/or coal) is converted in a first step into a mixture of hydrogen and carbon monoxide. This mixture is often referred to as synthesis gas or syngas. The present invention relates to process for preparing a paraffin product from a carbonaceous feedstock and a system for preparing a paraffin product from a carbonaceous feedstock.

10 Claims, No Drawings

PROCESS FOR PREPARING A PARAFFIN PRODUCT

CROSS-REFERENCE TO RELATED APPLICATIONS

This Application is a Divisional of U.S. application Ser. No. 15/747,485 filed Jan. 25, 2018, which is a National Stage (§ 371) of International Application No. PCT/EP2016/067744, filed Jul. 26, 2016, which claims priority from European Patent Application No. 15178563.1, filed Jul. 28, 2015 incorporated herein by reference, is now a U.S. Pat. No. 10,351,780.

FIELD OF THE INVENTION

The present invention relates to process for preparing a paraffin product from a carbonaceous feedstock and a system for preparing a paraffin product from a carbonaceous feedstock.

BACKGROUND TO THE INVENTION

The Fischer-Tropsch process can be used for the conversion of hydrocarbonaceous feed stocks into normally liquid and/or solid hydrocarbons (i.e. measured at 0° C., 1 bar). The feed stock (e.g. natural gas, associated gas, coal-bed methane, residual oil fractions, refuse, biomass and/or coal) is converted in a first step into a mixture of hydrogen and carbon monoxide. This mixture is often referred to as synthesis gas or syngas. The synthesis gas is fed into a reactor where it is converted over a suitable catalyst at elevated temperature and pressure into paraffinic compounds ranging from methane to high molecular weight molecules comprising up to 200 carbon atoms, or, under particular circumstances, even more.

The hydrocarbon products manufactured in the Fischer-Tropsch process may be processed into different fractions, for example a liquid hydrocarbon stream comprising mainly C5+ hydrocarbons, and a gaseous hydrocarbon stream which comprises methane, carbon dioxide, unconverted carbon monoxide, unconverted hydrogen, and lower hydrocarbons. The gaseous hydrocarbon stream may also comprise nitrogen and/or argon as the syngas sent to the Fischer-Tropsch reactor may contain some nitrogen and/or argon.

The gaseous hydrocarbon stream is often referred to as Fischer-Tropsch off-gas. Fischer-Tropsch off-gas can be recycled to the syngas manufacturing or to the Fischer-Tropsch reactor. Sometimes lower hydrocarbons are removed before the off-gas is recycled. Lower hydrocarbons may be removed by decreasing the temperature of the off-gas and then applying a gas-liquid separation. However, when the off-gas is recycled to the syngas manufacturing or to the Fischer-Tropsch reactor, the components in the off-gas which do not take part in the reactions, such as nitrogen and argon, occupy reactor space. The components which do not take part in the Fischer-Tropsch reaction are also referred to as "inerts".

The level of inerts in the Fischer-Tropsch reactor increases with increasing Fischer-Tropsch off-gas recycling. It is common to recycle only a relatively small part of the off-gas. One possibility is to recycle a part of the Fischer-Tropsch off-gas to one or more Fischer-Tropsch reactors and/or to the synthesis gas manufacturing unit, while another part of the off-gas is used as fuel. A downside of this is that only a part of the carbon atoms of the hydrocarbonaceous feed stock is converted to the desired C5+ hydrocarbons. The pace of the build-up of inerts can be reduced by treating the off-gas before it is recycled.

WO2014/102393 discloses a method for recovering carbon monoxide and carbon dioxide from Fischer-Tropsch off-gas by feeding Fischer-Tropsch off-gas through a column comprising an adsorbent bed.

US20080300326-A1 describes the use of a PSA method to separate Fischer-Tropsch off-gas. The method produces at least one gas stream comprising hydrogen, at least one gas stream mainly comprising methane, and at least one gas stream comprising carbon dioxide, nitrogen and/or argon, and hydrocarbons with at least 2 carbon atoms.

There is a desire to provide for a simplified way of removing inerts from off-gas. By having sufficient removal of inerts higher amounts of off gas can be recycled. An increase in recycle of off gas results in an increased conversion. This would make it possible to convert most of the carbon atoms of the hydrocarbonaceous feed stock to the desired C5+ hydrocarbons.

SUMMARY OF THE INVENTION

The present invention relates a system for preparing a paraffin product from a carbonaceous feedstock comprising the following:
 i. one or more reactors for converting the carbonaceous feedstock into a gas mixture comprising hydrogen and carbon monoxide;
 ii. one or more reactors for conducting a Fischer-Tropsch reaction, comprising a Fischer-Tropsch catalyst;
 iii. one or more gas separation units comprising a membrane for separating gas; wherein the gas separation unit is connected to the one or more reactors for converting carbonaceous feedstock such that a retentate gas obtained in the one or more gas separation units is provided to said one or more reactors for converting carbonaceous feedstock.

DETAILED DESCRIPTION OF THE INVENTION

The present invention provides for a process for preparing a paraffin product from a carbonaceous feedstock. The method comprises as an initial step the conversion of a carbonaceous feedstock into a gas mixture comprising hydrogen ($H_2$) and carbon monoxide (CO) also referred to as synthesis gas or syngas. Several methods are known in the art such as auto thermal reforming (ATR), partial oxidation and steam methane reforming. The syngas further comprises argon and nitrogen.

For the present invention the term carbonaceous feedstock is meant to include natural gas, associated gas, coal-bed methane, residual oil fractions, biomass and/or coal. In an embodiment of the present invention natural gas is preferred.

After conversion of the feedstock into syngas, the syngas is provided to a reactor for performing a Fischer-Tropsch reaction. In the reactor hydrogen and carbon monoxide are converted over a suitable catalyst (Fischer-Tropsch catalyst) at elevated temperature and pressure into paraffinic compounds ranging from methane to high molecular weight molecules comprising up to 200 carbon atoms. Besides the paraffin product, an off-gas is obtained. This off-gas comprises water, methane, carbon dioxide, hydrogen, carbon monoxide, C2-C5 hydrocarbons, argon and nitrogen. The off gas may further contain C5+ hydrocarbons, olefins and alcohols.

In an embodiment of the invention the off-gas is withdrawn from the reactor together with the paraffin product after which the off-gas is separated from the paraffinic product. In another embodiment the off-gas and paraffin product leave the reactor as separate streams and no further separation of off-gas and paraffin product is needed.

The off gas may be pretreated in order to remove acids, alcohols and the C5+ hydrocarbons. These treatments are well known in the art.

Said off-gas is fed to a separation unit comprising at least one gas separating membrane. Surprisingly, the inventors have found that the membranes disclosed in WO2011/053403 and WO2013/095775 are suitable to be used under circumstances associated with off-gas treatment. The membranes allow for the separation of inerts and carbon dioxide from the other constituents of off-gas.

WO2011/053403 and WO2013/095775 disclose methods of manufacturing carbon molecular sieve (CMS) membranes suitable for the present invention. The CMS membranes suitable for the present invention permit passage of the desired gases to be separated, carbon dioxide and methane and nitrogen and methane.

Two intrinsic properties are commonly used to evaluate the performance of a membrane material; "permeability" and "selectivity." Permeability is hereby defined as a measure of the intrinsic productivity of a membrane material; more specifically, it is the partial pressure and thickness normalized flux, typically measured in Barrer. Selectivity, meanwhile, is a measure of the ability of one gas to permeate through the membrane versus a different gas; for example, the permeability of CO2 versus CH4, measured as a unit-less ratio. In the gas separation unit the off-gas is contacted with a membrane such that certain components flow through the membrane whereas other components do not and remain in the retentate gas. In an embodiment the membrane has a carbon dioxide/methane selectivity of at least 35 and preferably at least 70. Hence for the present invention carbon dioxide permeates the membrane at least 35 times more than methane. The inventors have found that a membrane having such a carbon dioxide/methane selectivity provides good results with off-gas treatment.

In an embodiment the carbon membranes has a nitrogen/methane selectivity of at least 4.5. In an embodiment the carbon molecular sieve membrane has a nitrogen/methane selectivity of at least 4.5 and a carbon dioxide/methane selectivity of at least 70. The inventors have found that good results are obtained when treating off-gas. The inventors have found that good results are obtained with CMS membranes as disclosed in US20150290596.

For the present invention the selectivity is determined at a temperature of 40° C.

In an aspect of the invention the off gas is contacted in step iii with at least two membranes.

One having a carbon dioxide/methane selectivity of at least 35 and preferably at least 70. Hence for the present invention carbon dioxide permeates the membrane at least 35 times more than methane. The inventors have found that a membrane having such a carbon dioxide/methane selectivity provides good results with off-gas treatment.

One having a nitrogen/methane selectivity of at least 4.5. In an embodiment the carbon molecular sieve membrane has a nitrogen/methane selectivity of at least 4.5 and a carbon dioxide/methane selectivity of at least 70. The inventors have found that good results are obtained when treating off-gas.

In an embodiment of the present invention at least 50% of the carbon dioxide, based on the amount present in the off-gas, is recovered in the permeate gas, preferably at least 75% and more preferred at least 85% of the carbon dioxide is recovered in the permeate gas.

In an embodiment of the present invention the gas separation membrane is a carbon molecular sieve membrane, preferably at least two carbon molecular sieve (CMS) membranes having different gas separation properties are present. The inventors have found that a CMS membrane is suitable for separating nitrogen from methane in an off gas originating from a chemical reaction.

The CMS membranes are made from polymers that permit one or more of the desired gases to permeate through the polymer at different diffusion rates than other components, such that one of the individual gases, for example carbon dioxide, diffuses at a faster rate than methane through the polymer.

For use in making carbon molecular sieve membranes for separating CO2 and CH4, the most preferred polymers include the polyimides Ultem® 1000, Matrimid® 5218, 6FDA/BPDA-DAM, 6FDA-6FpDA, and 6FDA-IPDA.

Examples of other exemplary polymers include substituted or n substituted polymers and may be selected from polysulfones; poly(styrenes), including styrene-containing copolymers such as acrylonitrilestyrene copolymers, styrene-butadiene copolymers and styrene-vinylbenzylhalide copolymers: polycarbonates; cellulosic polymers, such as cellulose acetate-butyrate, cellulose propionate, ethyl cellulose, methyl cellulose, nitrocellulose, etc.; poly-amides and polyimides, including aryl polyamides and aryl polyimides; polyethers; polyetherimides; polyetherketones; poly(arylene oxides) such as poly(phenylene oxide) and poly(xylene oxide); poly(esteramide-diisocyanate); polyurethanes; polyesters (including poiyarylates), such as poly(ethylene terephthalate), poly(alkyl methacrylates), poly(acrylates), poly(phenylene terephthalate), etc.; poiypyrrolones; polysulfides; polymers from monomers having alpha-olefinic unsaturation other than mentioned above such as poly (ethylene), poly(propylene), poly(butene-1), poly(4-methyi pentene-1), polyvinyls, e.g., polyivinyl chloride), poly(vinyl fluoride), poly(vinylidene chloride), poly(vinylidene fluoride), polyfvinyl alcohol), poiyiyinyi esters) such as poly (vinyl acetate) and polyvinyl propionate), polyfvinyl pyridines), polyvinyl pyrrolidones), poly(vinyl ethers), polyfvinyl ketones), poly(vinyl aldehydes) such as polyfvinyl formal) and polyivinyl butyral), polyfvinyl amides), polyfvinyl amines), polyfvinyl urethanes), polyfvinyl ureas), poly(vinyl phosphates), and poly(vinyl sulfates); polyallyls; poly(benzobenzimidazole); polyhydrazides; polyoxadiazoles; polytriazoies; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Preferably, the polymer is a rigid, glassy polymer as opposed to a rubbery polymer or a flexible glassy polymer, Glassy polymers are differentiated from rubbery polymers by the rate of segmental movement of polymer chains. Polymers in the glassy state do not have the rapid molecular motions that permit rubbery polymers their liquid-like nature and their ability to adjust segmental configurations rapidly over large distances (>0.5 nm). Glassy polymers exist in a non-equilibrium state with entangled molecular chains with immobile molecular backbones in frozen conformations. As discussed, the glass transition temperature (Tg) is the dividing point between the rubbery or glassy state. Above the Tg, the polymer exists in the rubbery state; below the Tg, the polymer exists in the glassy state. Generally, glassy polymers provide a selective environment for gas diffusion and are favored for gas separation applications. Rigid, glassy polymers describe polymers with rigid polymer chain backbones that have limited intramolecular rotational mobility and are often characterized by having high glass transition temperatures ($T_g$>150° C.).

In rigid, glassy polymers, the diffusion coefficient tends to control selectivity, and glassy membranes tend to be selective in favor of small, low-boiling molecules. The preferred membranes are made from rigid, glassy polymer materials that will pass carbon dioxide, hydrogen sulfide and nitrogen preferentially over methane and other light hydrocarbons. Such polymers are well known in the art and include polyimides, polysulfones and cellulosic polymers.

The carbon membrane can comprise a hollow fiber membrane, a hollow fiber membrane comprising an asymmetric membrane, and/or a substantially non-collapsed, asymmetric hollow fiber membrane.

In an embodiment the carbon molecular sieve membrane is a carbon molecular sieve membrane formed from a polymer precursor by a process including the steps of providing a polymer precursor and subjecting the polymer precursor to pyrolysis, wherein the carbon membrane has a first gas permeance and a first gas separation selectivity, the improvement comprising the step of pre-treating at least a portion of the polymer precursor prior to pyrolysis such that after pre-treatment and pyrolysis, the improved carbon membrane has a second gas permeance and a second gas separation selectivity, wherein at least one of the second gas permeance or second gas separation selectivity is greater than the respective first gas permeance or first gas separation selectivity.

In an embodiment the membrane is an asymmetric carbon molecular sieve membrane formed from a polymer precursor modified using a modifying agent, preferably a substantially non-collapsed, asymmetrical carbon membrane. In some further embodiments, a precursor polymer is at least partially thermally and/or physically stabilized by exposing vinyl trimethoxysilane (VTMS) to the precursor. See for example the method of WO2013/095775, US2015/0290596 and US20150094445.

The inventors have found that good results are obtained with these kinds of CMS membranes.

With a substantially non-collapsed, asymmetric hollow fiber membrane is meant a membrane having at least a second gas permeance which is at least 3 times higher than its first gas permeance, preferably at least 5 times higher.

The off-gas supplied to the gas separation unit preferably comprises 5-50 vol % methane, 10-50 vol % carbon dioxide, 0.1-65 vol % carbon monoxide, 1-80 vol % hydrogen, up to 5 vol % C2-C5 hydrocarbons, 1-55 vol % nitrogen and up to 3 vol % of argon. The inventors have found that inerts and carbon dioxide can be removed from hydrocarbons, hydrogen and carbon monoxide. This results in an inert poor retentate gas. Due to the small amount of inerts present in the retentate gas it is possible to re-use the ingredients of the off-gas without the inerts being reintroduced into the system. Beneficially, this prevents the accumulation of inerts in the system.

In an embodiment of the invention the gas separation unit is operated at a pressure ranging from 10 to 90 preferably 30-60 bar.

In an embodiment, the off-gas is CO shifted prior to being fed to the gas separation unit. In this case, the off-gas is fed through one or more high, medium or low temperature shift reactor(s) or a combination thereof. Further, this results in the conversion of trace compounds such as olefins. In the shift reactor at least part of the carbon monoxide and water is converted into hydrogen and carbon dioxide. In case necessary steam can be added to the off-gas in order to facilitate the CO shift reaction. Hence, compared to the hydrogen content of the off-gas fed through the shift reactor, the hydrogen content of the gas leaving the reactor is increased. The CO shift is performed prior to step iii of the invention. In case a CO shift is applied the hydrogen to be supplied upstream of the conversion of a gas mixture comprising natural gas to obtain a mixture comprising hydrogen and carbon monoxide, is increased. Optionally the CO shift can be applied only in case additional hydrogen is required upstream (for example in the Fischer-Tropsch reaction).

In an embodiment the off-gas is subjected to a pretreatment step, preferably the pretreatment step comprises feeding said off gas to an adsorption unit such as a thermal swing adsorption unit, a pressure swing adsorption unit or an adsorption unit comprising adsorption material which cannot be regenerated.

The method according to the present invention is preferably conducted in a system for preparing a paraffin product from a carbonaceous feedstock according to the present invention. Said system comprises the following:
  i. one or more reactors for converting the carbonaceous feedstock into a gas mixture comprising hydrogen and carbon monoxide;
  ii. one or more reactors for conducting a Fischer-Tropsch reaction, comprising a Fischer-Tropsch catalyst;
  iii. one or more gas separation units comprising a membrane for separating gas;
  wherein the gas separation unit is connected to the one or more reactors for converting carbonaceous feedstock such that a retentate gas obtained in the one or more gas separation units is provided to said one or more reactors for converting carbonaceous feedstock.

In an aspect of the invention the gas separation unit comprises a housing with provided therein a gas separation membrane. These housings (often known as modules) are typically metallic and designed to separate the high pressure feed and retentate from the low pressure permeate. These housings are well known in the art and are commercially available.

In an aspect of the invention the gas separation unit comprises at least two carbon molecular sieve membranes having different gas separation properties, preferably the carbon molecular sieve membrane is a hollow fiber membrane, a hollow fiber membrane comprising an asymmetric membrane, and/or a substantially non-collapsed, asymmetric hollow fiber membrane.

In an aspect of the invention the gas separation unit comprises at least two CMS membranes:
  One having a carbon dioxide/methane selectivity of at least 35 and preferably at least 70. Hence for the present invention carbon dioxide permeates the membrane at least 35 times more than methane. The inventors have found that a membrane having such a carbon dioxide/methane selectivity provides good results with off-gas treatment.

One having a nitrogen/methane selectivity of at least 4.5. In an embodiment the carbon molecular sieve membrane has a nitrogen/methane selectivity of at least 4.5 and a carbon dioxide/methane selectivity of at least 70. The inventors have found that good results are obtained when treating off-gas.

For each of the membranes the retentate gas comprises at least carbon monoxide, methane and hydrocarbons.

The system according to the present invention may further comprising one or more pretreatment units, preferably said pretreatment unit comprises an adsorption based unit such as a thermal swing adsorption unit, a pressure swing adsorption unit or an adsorption unit comprising adsorption material which cannot be regenerated.

Preferably, the one or more reactors for conducting a Fischer-Tropsch reaction comprises a catalyst selected from Group VIII metals, preferably cobalt, iron and/or ruthenium, more preferably cobalt. In an embodiment the reactor comprises a fixed bed of cobalt based catalysts. Fisher-Tropsch catalysts are known in the art. They typically comprise a Group VIII metal component, preferably cobalt, iron and/or ruthenium, more preferably cobalt.

The catalyst may further comprise one or more promoters. One or more metals or metal oxides may be present as promoters. Suitable metal oxide promoters may be selected from Groups 2-7 of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are suitable promoters. Suitable metal promoters may be selected from Groups 7-10 of the Periodic Table of Elements. Manganese, iron, rhenium and Group 8-10 noble metals are particularly suitable as promoters, and are preferably provided in the form of a salt or hydroxide. The promoter, if present in the catalyst, is typically present in an amount of from 0.001 to 100 parts by weight per 100 parts by weight of carrier material, preferably 0.05 to 20, more preferably 0.1 to 15. It will however be appreciated that the optimum amount of promoter may vary for the respective elements which act as promoter.

Alternatively, two or more gas separating units may be used each housing one membrane.

Typically, the catalysts comprise a catalyst carrier. The catalyst carrier is preferably porous, such as a porous inorganic refractory oxide, more preferably alumina, silica, titania, zirconia or combinations thereof. The catalyst carrier preferably comprises titania, preferably porous titania. Preferably more than 70 weight percent of the carrier material consists of titania, more preferably more than 80 weight percent, most preferably more than 90 weight percent, calculated on the total weight of the carrier material. As an example of a suitable carrier material can be mentioned the commercially available Titanium Dioxide P25 ex Evonik Industries. The carrier preferably comprises less than 40 wt % rutile, more preferably less than 30 wt %, even more preferably less than 20 wt %.

References to the Periodic Table and groups thereof used herein refer to the previous IUPAC version of the Periodic Table of Elements such as that described in the 68th Edition of the Handbook of Chemistry and Physics (CPC Press).

In an embodiment of the invention downstream of the Fischer-Tropsch reactor and upstream of the gas separation unit at least one CO shift reactor is provided. The off-gas withdrawn from the Fischer-Tropsch reactor is provided to the CO shift reactor via a conduit connecting the FT reactor with the CO shift reactor. It is preferred that the conduit is provided with an inlet for providing additional water to the off-gas is case necessary. The provision of water may be required in case the off-gas comprises too little water.

In an embodiment the hydrocarbon synthesis is at least initially, a steady state catalytic hydrocarbon synthesis process. A steady state catalytic hydrocarbon synthesis process may be performed under conventional synthesis conditions known in the art. Typically, the catalytic conversion may be effected at a temperature in the range of from 100 to 600° C., preferably from 150 to 350° C., more preferably from 175 to 275° C., most preferably 200 to 260° C.

In an embodiment the reactors are operated at a pressure ranging from 10 to 100 bar absolute. Preferably the total pressures for the catalytic conversion process are in the range of from 5 to 80 bar absolute.

A suitable regime for carrying out the Fischer-Tropsch process with a catalyst comprising particles with a size of least 1 mm is a fixed bed regime, especially a trickle flow regime. A very suitable reactor is a multitubular fixed bed reactor. In an embodiment of the invention the catalyst is present in one or more of the reactors as a fixed bed catalyst.

While the invention has been described in terms of what are presently considered to be the most practical and preferred embodiments, it is to be understood that the disclosure need not be limited to the disclosed embodiments. It is intended to cover various modifications, combinations and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Any patents, publications, or other references mentioned in this application for patent are hereby incorporated by reference. In addition, as to each term used, it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans.

By way of this reference the appended claims also form an integral part of this description.

What is claimed is:

1. A system for preparing a paraffin product from a carbonaceous feedstock comprising the following:
   i. one or more reactors for converting the carbonaceous feedstock into a gas mixture comprising hydrogen and carbon monoxide;
   ii. one or more reactors for conducting a Fischer-Tropsch reaction, comprising a Fischer-Tropsch catalyst; and
   iii. one or more gas separation units comprising a carbon molecular sieve membrane for separating gas; wherein the one or more gas separation units:
      is connected to the one or more reactors for conducting a Fischer-Tropsch reaction such that the one or more reactors for conducting a Fischer-Tropsch reaction provides an off-gas to the one or more gas separation units; and is connected to the one or more reactors for converting carbonaceous feedstock such that a retentate gas obtained in the one or more gas separation units is provided to said one or more reactors for converting carbonaceous feedstock; and wherein the system comprises at least two carbon molecular sieve membranes having different gas separation properties.

2. The system according to claim 1, further comprising one or more pretreatment units.

3. The system according to claim 2, wherein the pretreatment unit comprises an adsorption-based unit.

4. The system according to claim 3, wherein the adsorption-based unit is selected from a thermal swing adsorption unit, a pressure swing adsorption unit and an adsorption unit comprising adsorption material which cannot be regenerated.

5. The system according to claim 1, comprising downstream of the Fischer-Tropsch reactor and upstream of the gas separation unit at least one CO shift reactor.

6. The system according to claim 1, wherein one of the at least two carbon molecular sieve membranes has a carbon dioxide/methane selectivity of at least 35 and one has a nitrogen/methane selectivity of at least 4.5.

7. The system according to claim 1, wherein the carbon molecular sieve membrane is selected from the group consisting of a hollow fiber membrane, a hollow fiber membrane comprising an asymmetric membrane, a substantially non-collapsed, asymmetric hollow fiber membrane, and combinations thereof.

8. The system according to claim 1, wherein the catalyst is selected a Group VIII metal.

9. The system according to claim 1, wherein the catalyst is selected from the group consisting of cobalt, iron, ruthenium and combinations thereof.

10. The system according to claim 1, wherein the catalyst is cobalt.

* * * * *